United States Patent

[11] 3,615,665

[72] Inventors William V. White, deceased
 late of Spring Valley, N.Y. by Grace H.
 White, heir and executrix;
 Claudia L. White and Roger E. White,
 heirs, Spring Valley, N.Y.; James P.
 Mahlmann, Wayne; Robert P. Stolz,
 Dumont, N.J.
[21] Appl. No. 849,531
[22] Filed Aug. 12, 1969
[45] Patented Oct. 26, 1971
[73] Assignee General Foods Corporation
 White Plains, N.Y.

[54] CONFINED VOLUME COFFEE AROMA
 11 Claims, No Drawings
[52] U.S. Cl. .................................................... 99/65,
 99/68, 99/71
[51] Int. Cl. ..................................................... A23f 1/04
[50] Field of Search ............................................. 99/65, 68,
 71

[56] References Cited
 UNITED STATES PATENTS

| | | | |
|---|---|---|---|
| 2,278,473 | 4/1942 | Musher ........................ | 99/65 |
| 3,244,531 | 4/1966 | Clinton et al. ................ | 99/71 |
| 3,244,532 | 4/1966 | Mahlmann ................... | 99/71 |
| 3,420,674 | 1/1969 | McCartney................... | 99/71 |
| 3,421,901 | 1/1969 | Mahlmann et al. ........... | 99/71 |

Primary Examiner—Tim R. Miles
Assistant Examiner—William L. Mentlik
Attorneys—Gerald E. Jacobs, Bruno P. Struzzi and Thomas V. Sullivan ABSTRACT: A new method of stripping desirable volatiles from roasted coffee has been discovered which does not significantly degrade the quality of the roasted coffee. Roasted coffee is contacted with dry steam in a confined volume at above atmospheric pressures. The pressure is then relieved and the vapors which escape due to the reduction of pressure in the column are condensed to recover aromatic and flavor constituents.

CONFINED VOLUME COFFEE AROMA

This application is a continuation in part of copending application Ser. No. 571,382 filed Aug. 10, 1966, now U.S. Pat. No. 3,476,566, entitled "Flavor-Improved Process for Coffee."

BACKGROUND OF THE INVENTION

This invention relates to a novel method of stripping desirable volatiles from roasted coffee and collecting these volatile materials for further use. More particularly, the invention concerns a method wherein undesirable aroma components and gases are removed from roasted coffee thus improving the quality of lower grade coffees, also, by carefully controlling conditions, the quality of high grade coffees is not significantly degraded and the total volatile fraction is found to contain desirable aromatic and flavor constituents.

Prior art processes for steam stripping volatile constituents from roasted coffee are carried out at atmospheric conditions and under vacuum. The coffee in these processes are exposed to steam treatment for relatively long periods of time, e.g. 20 minutes and more. This long exposure to steam invariably degrades desirable coffee qualities to an extent whereby the quality of the beverage prepared with the treated coffee is inferior to the beverage prepared with untreated coffee.

In U.S. Pat. No. 2,278,473 a method of enhancing coffee beans by subjecting the coffee to elevated temperatures and pressures and suddenly releasing the coffee to a lower temperature and pressure is disclosed. In the aforementioned process the coffee beans are ejected from the chamber in order to disrupt the cell structure of the coffee bean. A very broad range of temperatures and pressures are cited and generally the desired upgrading is said to be achieved at pressures of from 100 to 350 lbs. per square inch and temperatures of from 300° to 550° F.

In copending application Ser. No. 571,382 now Pat. No. 3,476,566 a method upgrading roasted coffee by the removal of undesirable gases was claimed in which the coffee is prewet, allowed to equilibrate at a moisture content of between 4 percent and 40 percent, heated under atmospheric conditions such that some of the water is vaporized. The vaporized water carries with it undesirable volatile constituents from the roasted coffee, thus upgrading the quality of coffee which contains high amounts of undesirable flavor and aroma volatiles prior to treatment.

SUMMARY OF THE INVENTION

This invention is founded on the discovery that roasted coffee with a moisture content of less than 40 percent can be heated within a narrow temperature range at elevated pressures, within a defined range, for a relatively short time such that not only the flavor of lower quality coffees (e.g. Robustas) can be improved, but that desirable volatiles can be liberated from the roasted coffee without significantly degrading higher quality coffees (e.g. Columbians). The coffee is maintained at an elevated pressure by the introduction of high-pressure steam into a pressure vessel. When the pressure in the vessel is released the escaping water vapors carry with them volatile coffee constituents. It has been found that by carefully controlling condenser temperatures, a preferred fraction of coffee volatiles can be condensed and collected while less desirable volatiles pass on through the condenser system.

As used in this invention roasted coffee includes both the whole roasted bean and ground roasted coffee particles. It has been found that roasted coffee after being subjected to the process of this invention can be further treated via normal processes for the manufacture of regular coffee or soluble coffee.

The volatiles recovered via the process of this invention can be used to enhance the flavor of coffee extract prior to drying, to enhance the flavor of soluble coffee or as a flavor additive for other food products.

Most unexpectedly, it has been found that while lower grade coffees are upgraded by elimination of undesirable volatile constituents, the condensed volatiles have desirable flavor characteristics. The coffee treated via the process of this invention can be further processed for use as regular coffee or to prepare soluble coffee.

DESCRIPTION OF THE PREFERRED EMBODIMENT

Essentially, this invention involves heating roasted coffee at a moisture content of less than 40 percent in a confined vessel under pressure. The pressure is built up by introducing steam into the vessel and isolating the vessel after a predetermined pressure is achieved. The moisture in the coffee is in intimate contact with the aroma and flavor constituents through the coffee bean, and when the pressure is relieved by venting, aroma and flavor constituents are carried out of the zone with the escaping vapors. The aromatic and flavor constituents are recovered in a condenser system. It has been found that a preferred moisture level for coffee to be treated in by process of this invention is about 1 percent to 7 percent by weight of the wetted coffee.

The coffee, at a desired moisture level, is charged into a pressure vessel wherein it is heated by passing steam through the vessel. The coffee is heated to a temperature of from 240° to 350° F. The steam displaces the air in the vessel which is forced out through a vent line. When the temperature of the exiting gases reaches a predetermined temperature, usually below the preferred temperature range for pressure treatment, the vent line is isolated. This preheating step should be achieved within 5 minutes and preferably in 1 to 2 minutes. The heating time can be controlled by using steam at a sufficiently high pressure to achieve the heating in the desired time.

The pressure in the vessel is then increased to above atmospheric pressure by continuing the flow of steam into the vessel. When the pressure has been increased to a preselected level of from 10 to 100 p.s.i.g. the vessel is isolated by closing off the flow of steam. The coffee beans are then maintained at the elevated pressure for a period of from 15 seconds to 10 minutes, preferably 2 to 5 minutes. During this period of time a portion of the water within the beans is vaporized and displaces volatile constituents within the coffee bean. The upper limit of 10 minutes is critical in order to avoid significantly degrading the roasted coffee. Similarly the pressures and temperatures are critical and a preferred range of pressures is from 20 to 50 p.s.i.g. The temperature is maintained at least as high as the temperature of saturated steam at the preselected pressure in order to avoid condensing additional water while the coffee beans are under pressure.

It has been found that under the aforementioned temperature and pressure conditions the moisture in the coffee beans is readily equilibrated throughout the coffee (whether the beam is in whole or subdivided form) so that the moisture can displace, absorb or react with any undesirable volatiles present in the interior portions of said coffee. Obviously, the desirable volatile constituents are also in intimate contact with the equilibrated moisture. The preferred period of contact is from 1 to 4 minutes as compared to an equilibration period of from 1 to 2 hours which is often necessary under atmospheric conditions.

The vent line is then opened and the water vapors and displaced volatile constituents of the coffee flow out of the vessel until the pressure within the vessel is reduced to atmospheric pressure. It is important to size the vent line such that the pressure is relieved in a reasonable period of time, preferably 1 to 2 minutes, and at most 5 minutes. An excessive time in venting will expose the coffee to undesirable additional heat treatment. It is also important to avoid too rapid a release of pressure. If the gases escape too quickly, it will require an impractically large condenser system to trap and condense the volatile flavor and aroma constituents. Also, too sudden a release of pressure will result in something like gun-puffing or an explosion of the coffee and this is to be avoided. The escaping water vapors and coffee volatiles are passed through a condenser system wherein the volatiles are condensed and collected. For the purpose of this invention, the vessel is considered to have reached atmospheric pressure when a gage at the top of the vessel indicates atmospheric pressure. It is understood that there may be a pressure gradient remaining from top to bottom of the vessel. The process does not require waiting for the pressure throughout the column to reach atmospheric conditions.

Unexpectedly, it has been found that the steam treatment under pressure not only drives off what would be undesirable volatile constituents, if said constituents were to remain in the coffee, but apparently chemically changes the makeup of these undesirable volatiles such that all of the volatiles collected in the condensate system have desirable coffee characteristics. Thus, the so called undesirable volatiles are condensed and collected together with normally desirable volatiles to yield a valuable, flavor enhanced, condensate.

It has been found that the condenser temperature should be maintained at a maximum of about 100° F. If higher temperatures are used a desired fraction of the volatile material will pass on through the condenser system and the resultant condensate will have a weak or thin character. The condenser temperature can be as cold as desired and liquid nitrogen has been used as a cooling medium for some experimental work. A preferred range of condensate temperatures is from 30° to 90° F. and the most preferred range is from 50° to 75° F.

While the coffee beans are still in the vessel the steam stripping process of this invention can be followed by purging the vessel and coffee with an inert gas, preferably nitrogen. It has been found that the inert gas will pick up and carry out of the vessel additional coffee volatiles which can be condensed and added to the volatile fraction already collected with the condensed water vapors. The volatiles coming off with the nitrogen can be separated into fractions by collecting a predetermined volume of additional volatiles based upon the weight of coffee in the vessel and the geometry of the system. Successive fractions of volatiles have been found to have distinct flavor characteristics and a given fraction may be more desirable for some specific applications than the combined condensate.

It has been found that the steam treatment can be shortened by preheating the pressure vessel prior to charging the coffee into the vessel. The walls of the vessel are preheated to at least the temperature to be maintained during the period in which the beans are isolated under pressure. In order to avoid unnecessary degradation of the coffee beans it is desirable to complete the process of this invention, from the point wherein steam is introduced to the vessel to the point in the process wherein the pressure in the vessel after being raised is again reduced to atmospheric pressure, in a total time not exceeding 15 minutes. It has also been found that a preferred period of time wherein the beans are maintained at the elevated pressure is from 1 to 4 minutes when using pressure of from 20 to 50 p.s.i.g.

It has been found that as an alternative to building up the pressure with steam, the pressure can be achieved by heating an isolated vessel containing coffee and sufficient added water, such that when the added water is vaporized the desired pressure will be build up. Thus, coffee can be charged into an autoclave. Water is added to the autoclave. The autoclave is isolated and heated externally to vaporize the water and the coffee is maintained in contact with the vapors for from 1 to 10 minutes. The pressure is then relieved by venting the autoclave to atmospheric pressure and the escaping gases are passed through a condenser system.

The following examples will further describe the process of this invention:

Example I

One hundred and five pounds of roasted coffee beans at a moisture content of 7 percent were charged into a stainless steel insulated column (8 inches diameter by 14 feet) which had been preheated to a temperature of 350° F. Steam at 40 p.s.i.g. was fed into the bottom of the column to heat the beans and flush out the air through a vent line at the top of the column. After 1½ minutes the gases exiting from the vent line had a temperature of about 240° F. and the vent valve was closed. The pressure in the column was raised to 30 p.s.i.g. by continuing to feed steam into the column for about 1 minute. The column was then isolated by closing off the steam line and the coffee was maintained under pressure for 2 minutes. The top vent valve was then opened and the volatile coffee constituents and water vapor allowed to pass into a condenser which was maintained at 45° F. with chilling water. The flow of vapors continued for 2 minutes before the pressure in the column was reduced to atmospheric pressure and 750 ml. of condensate was collected at a temperature of from 75° to 65° F. as it came out of the condenser.

The charged coffees were a blend of Columbians and Robustas. A brew of the treated coffee was prepared and the resultant brew was found to be richer and had a more desirable flavor then a brew similarly prepared with the same blend of coffees which had not been subjected to the process of this invention. Thus, there is proof that the upgrading associated with the process of this invention was achieved. Also the flavor of the Columbian coffee was not significantly degraded. In addition to improving the flavor of the brew it was found that the clarity of the brew prepared from the treated coffee was improved.

The condensate was found to contain a blend of desirable coffee flavor notes.

Example II

Coffee treated as in example I was extracted in a typical soluble coffee extraction process. The condensed volatiles obtained in example I were added to the extract prior to spray drying the extract. The resultant soluble coffee was significantly enhanced and considered superior to a similar soluble coffee prepared without the addition of condensed volatiles.

Example III

The process of example I was prepared. After the pressure in the column had been reduced to atmospheric pressure nitrogen gas was passed through the coffee in the column. Seven hundred fifty milliliters of condensate containing additional volatiles was collected from the condenser in 1 minute. These volatiles were added to the 750 ml. of condensate originally collected and it was found that the additional volatiles added desirable coffee notes to the condensate not previously detected.

Similarly, a third fraction of volatiles was collected by continuing the nitrogen flush and condensation technique for another minute. Once again, the additional condensate added new and desirable coffee notes to the condensate.

Example IV

A cylindrical pressure vessel having a height of 13 feet and a width of 10 inches was preheated prior to introduction of the coffee charge by injecting steam into the closed vessel for about 10 minutes until the temperature of the vessel walls reached 350° F. The vessel was then opened and vented to atmosphere. A 100-pound charge of roasted Robusta coffee (Indonesian variety having a normal roasted color and ground to a particle size wherein 97 percent of the coffee was retained on a 40-mesh U.S. Standard Screen and having a moisture content of 20 percent was placed inside the vessel. The vessel was isolated except for a vent valve at the top. Steam at 50 p.s.i.g. was passed through the coffee for 1 minute to heat the coffee and purge entrapped air. The vent valve was then closed and steaming was continued until a pressure of 35 p.s.i.g. was developed in the vessel. The steam flow was then shut off and the coffee maintained at an elevated temperature and pressure for 2 minutes. The vessel was vented and the escaping vapors were passed over a condenser similar to that used in example I.

The Robusta coffee was found to have been upgraded, as evidenced by a more desirable brew then that obtained from the equivalent coffee which was not treated.

The condensate was found to have desirable coffee notes which enhanced the flavor of soluble coffee when added thereto. While this invention has been described by reference to several specific examples, it is understood to be limited only by the scope of the appended claims.

What is claimed is:

1. A process for separating and collecting desirable coffee volatiles from roasted coffee comprising placing roasted coffee in a vessel, said roasted coffee having a moisture content of from 1 to 40 percent by weight, passing steam into said vessel through a steam inlet line thus heating the roasted coffee to a temperature of from 240° to 350° F. and displacing gases in the vessel, said gases being forced out a vent line, closing said vent line when the exiting gases are at a predetermined temperature, continuing to pass steam into the vessel until the pressure within the vessel is increased to a level of from 10 to 100 p.s.i.g., the temperature of the coffee having been heated to a temperature at least equivalent to the temperature of saturated steam at the elevated pressure, closing off the steam inlet line thus isolating the vessel at the elevated pressure, maintaining the roasted coffee under pressure for from 15 seconds to 10 minutes, opening said vent line thus allowing water vapors to flow out of the vessel until the pressure in the vessel is reduced to atmospheric pressure, said water vapor carrying along coffee volatiles liberated from the roasted coffee, condensing a fraction of the coffee volatiles and water vapor at temperatures of from −100° F. to a maximum of 100° F. such that a maximum condensate temperature of 100° F. is achieved and collecting said condensate.

2. The process of claim 1 wherein the total elapsed time from the time the steam is first introduced into the vessel to the time the vessel is returned to atmospheric pressure is less than 15 minutes.

3. The process of claim 2 wherein the pressure within the vessel is raised to a pressure of from 20 to 50 p.s.i.g. and is maintained at said pressure for from 1 to 4 minutes prior to opening the vent line.

4. The process of claim 3 wherein the condensate is at from 35° to 90° F.

5. The process of claim 3 wherein the condensate is at from 50° to 75° F.

6. The process of claim 1 wherein an inert gas is blown through the vessel after it is at atmospheric pressure, said inert gas sweeping out additional coffee volatiles, condensing said additional volatiles and combining the additional condensed volatiles with the initial volatiles carried out with the water vapors.

7. The process of claim 1 wherein the vessel is preheated prior to introduction of steam into the column, the temperature of the vessel being raised to at least the temperature of saturated steam at the pressure to be maintained when the vessel is isolated at above atmospheric pressure.

8. The process of claim 4 wherein an inert gas is blown through the vessel after it is at atmospheric pressure, said inert gas sweeping out additional coffee volatiles, condensing said additional volatiles and combining the additional condensed volatiles with the initial volatiles carried out with the water vapors.

9. A process for upgrading roasted coffee having a high amount of undesirable flavor and aroma constituents comprising placing roasted coffee in a vessel, said roasted coffee having a moisture content of from 1 to 40 percent by weight, passing steam into said vessel through a steam inlet line thus heating the roasted coffee to a temperature of from 240° to 350° F. and displacing gases in the vessel, said gases being forced out a vent line, closing said vent line when the exiting gases are at a predetermined temperature, continuing to pass steam into the vessel until the pressure within the vessel is increased to a level of from 10 to 100 p.s.i.g., the temperature of the coffee having been heated to a temperature at least equivalent to the temperature of saturated steam at the elevated pressure, closing off the steam inlet line thus isolating the vessel at the elevated pressure, maintaining the roasted coffee under pressure for from 15 seconds to 10 minutes, opening said vent line thus allowing water vapors to flow out of the vessel until the pressure in the vessel is reduced to atmospheric pressure, said water vapor carrying along coffee volatiles liberated from the roasted coffee.

10. The process of claim 9 wherein the total elapsed time from the time the steam is first introduced into the vessel to the time the vessel is returned to atmospheric pressure is less than 15 minutes.

11. The process of claim 10 wherein the pressure within the vessel is raised to a pressure of from 20 to 50 p.s.i.g. and is maintained at said pressure for from 1 to 4 minutes prior to opening the vent line.

* * * * *